March 12, 1935. A. M. ERICHSEN 1,994,388
APPARATUS FOR MEASURING AND INDICATING FORCES
Filed July 16, 1931 3 Sheets-Sheet 1
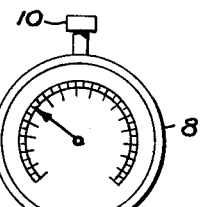
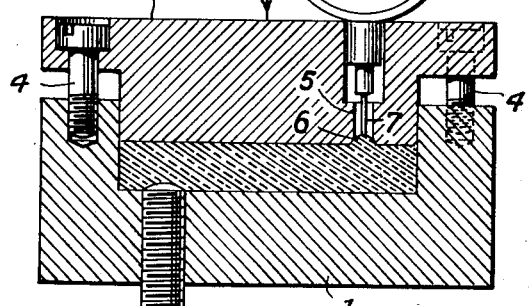
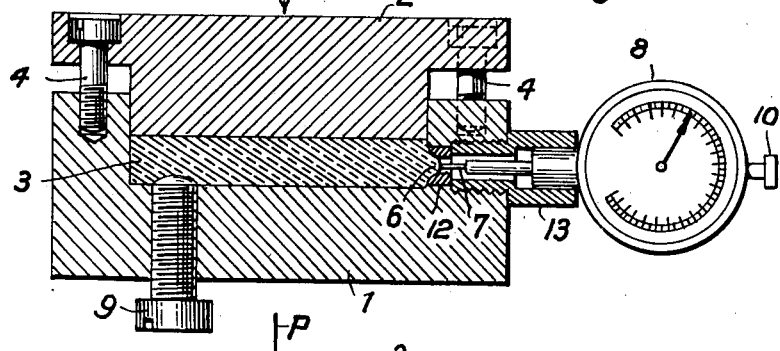
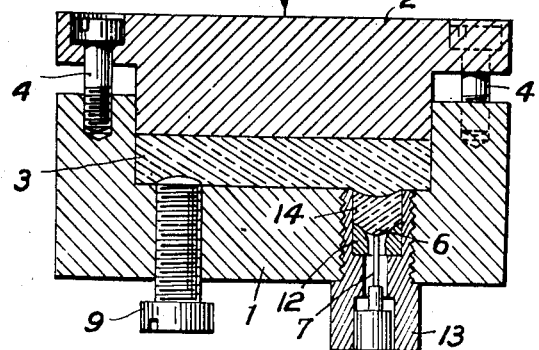
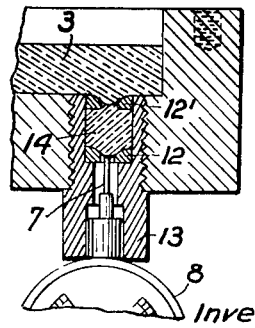
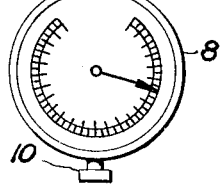
Inventor:
Abraham M. Erichsen.
By William C. Linton.
Attorney.

March 12, 1935.  A. M. ERICHSEN  1,994,388
APPARATUS FOR MEASURING AND INDICATING FORCES
Filed July 16, 1931    3 Sheets-Sheet 2
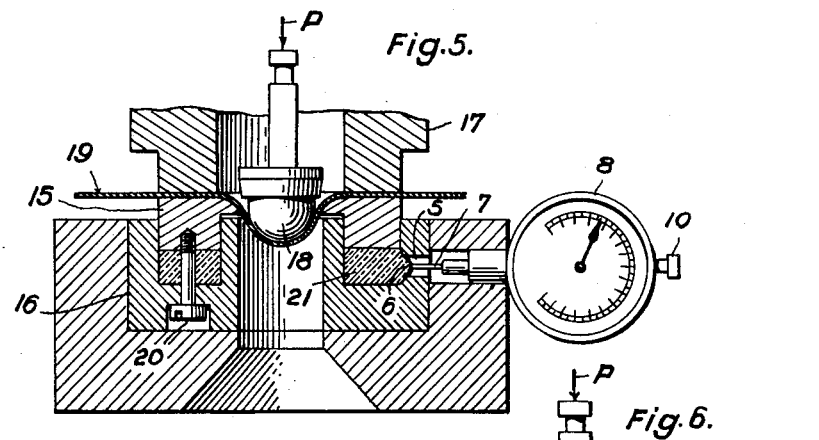
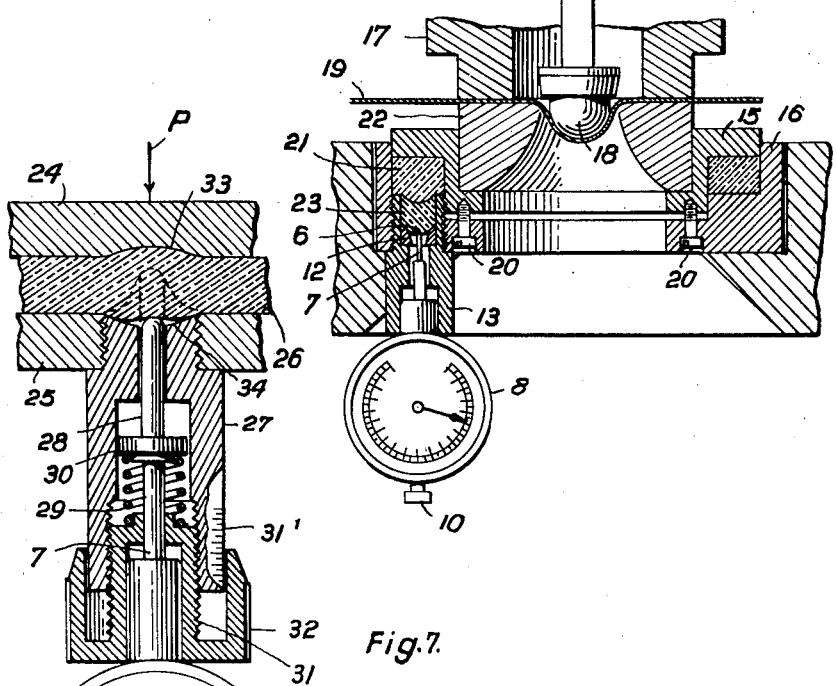
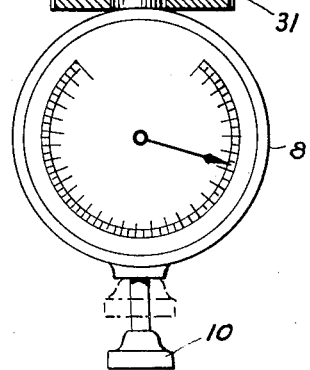
Inventor:
Abraham M. Erichsen.
By William C. Linton.
Attorney.

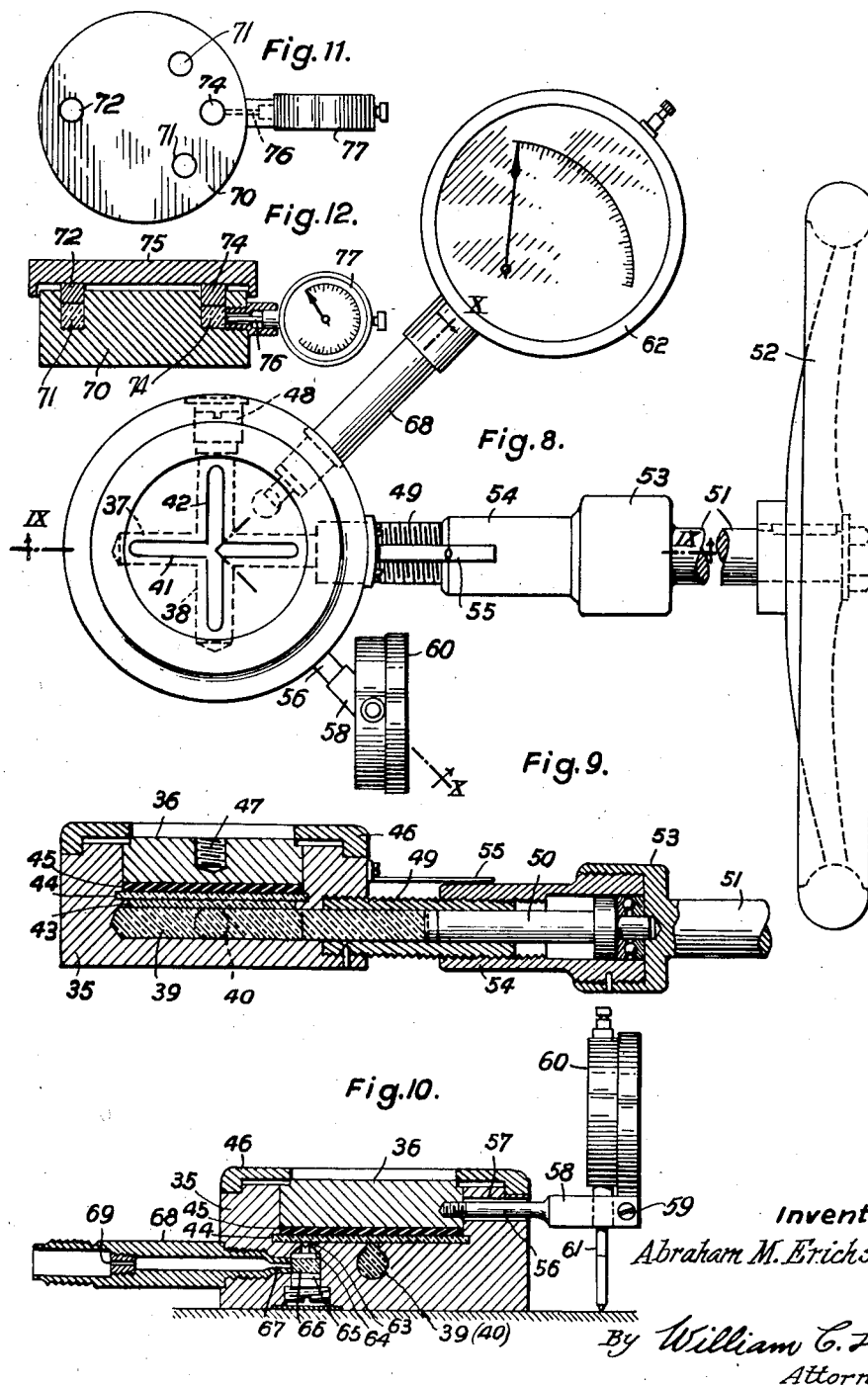

UNITED STATES PATENT OFFICE 1,994,388

APPARATUS FOR MEASURING AND INDICATING FORCES

Abraham Martinius Erichsen, Teltow, near Berlin, Germany

Application July 16, 1931, Serial No. 551,236
In Germany July 18, 1930

13 Claims. (Cl. 265—1)

The present invention relates to a device for measuring forces, pressures and motions, and for adjusting machine parts and the like.

For measuring or indicating forces, pressures and motions or for adjusting machine parts and the like, hydraulic equipment has been preferably used till now, especially if very great forces or pressures were concerned. The specific pressure involved in such cases is, however, very much limited by the fact that the packings of pistons and the like do not withstand high pressure in the long run, and that is the reason why hydraulic presses, for example, seldom have a higher working pressure than 300 atmospheres. Hydraulic devices for indicating and measuring forces or motions are known also, in which an elastic material, such as rubber, is contained within a chamber closed on all sides and by the change of form effected in response to the pressure of the force to be tested acts on a deformable liquid piping disposed between the elastic material whereby the liquid is displaced and acts on a pressure gauge. Still other devices are known utilizing the compressibility of a compressible mass enclosed within a chamber with pressure plate for indicating forces by causing the back pressure of the compressed mass to act on a driving worm adapted to be longitudinally displaced on its shaft against the action of a spring and by transmitting this longitudinal displacement to an indicating device.

The present invention differs from the prior art chiefly by employing a highly elastic, non-metallic and non-fluid material, preferably rubber, as pressure medium which is pressed out of the chamber receiving it and provided with a pressure plate or piston through one or several openings or which acts on a fixed or elastic member introduced from without. A soft rubber body enclosed in a pressure chamber according to the hydraulic system transmits within certain limits the pressure like a liquid, and highly elastic rubber, after the pressure ceases, discloses furthermore a tendency always to regain the original form of the mass deformed by pressure, even if deformed by very high pressure. A further considerable advantage afforded in connection with the use of a highly elastic material as pressure medium is that special packings for pistons and the like, which are absolutely necessary in case of liquids, can be dispensed with, even if the specific pressures should reach 5000 atmospheres or more. Moreover, as the pressure medium cannot escape through packings or by evaporation and pressure and pump chambers will not be affected by it, it is evident that the invention can be applied to all cases, particularly if greatest pressures are employed, which would be out of the question if the known hydraulic principle operating with liquid as pressure medium were to be relied on. Although rubber as pressure medium is elastic and deformable within very wide limits, its capacity to flow, compared with that of a liquid, is naturally restricted, and for this reason the devices for carrying out the process are constructed so as to enable them to produce and measure high and highest pressures at small and smallest motions of the pressure piston, while large outputs are of course out of the question.

Experiments have shown that rubber when used as pressure medium discloses as little constancy of volume as water at high and highest pressures. For example, at a specific pressure of 3000 atmospheres a rubber body will be compressed to the extent of about 11% of its original volume, thus behaving in this respect exactly like water. When the pressure ceases, rubber reassumes essentially the original volume and the original form, even upon repeated stressing and even if it was exposed to very high pressures, unlike most metallic and non-metallic materials which, as generally known, at high pressures undergo permanent changes of form and assume a smaller volume after the elastic limit has been exceeded. These little known properties of rubber are of greatest value for carrying out the process according to the invention, as the system is in perfect harmony with the laws of elasticity. The rubber mass can easily and very inexpensively be renewed upon the possible appearance of fatigue phenomena after extended period of use thereof.

The inherent elasticity of the highly elastic medium is, moreover, made use of to a slight extent only, as the deformation may be very small. The losses by friction of the piston and pressure medium are very slight in connection with the new method, since the piston has no special packings and the flow of the pressure medium takes place chiefly in the core of the pressure medium and not on the walls of the pressure chamber where the friction would be greater.

The specific pressure is transmitted through the mass of the highly elastic pressure medium in exactly the same manner as in a liquid. Small auxiliary pistons may be provided to reduce the specific pressure in a special measuring chamber.

For example, when measuring pressures, the main pressure may be received by pistons in one or several closed chambers in which the highly elastic material is compressed only while the piston motion is recorded by a special measuring chamber in which the specific pressure may be very slight.

In this case, the pressure medium may be pressed out freely through one or several openings or nozzle or act on a solid or elastic body introduced from without into the pressure or measuring chamber, the height of the bulging portion or the expelling motion of the introduced body being measured by sensitive instruments, such as a clock dial micrometer, and affording a criterion for the height of pressure exerted.

When pressure on the device ceases, the pressed out bulges or other deformations of the pressure medium together with the pressure piston will be returned to their original position, and the device will thus be almost instantly in zero position again.

The range of usefulness of the new method is very great, and the latter can be applied wherever high and highest pressures are to be produced or measured at relatively small motions or performances, such as when producing pressure for adjusting machine parts and the like, as, for example, the rollers in rolling mills, or when measuring pressure in material testing machines, presses, lifting appliances, scales, and other machines or machine elements, such as set or thrust screws and the like. During the adjustment of rollers in rolling mills it is, for instance, highly important to be able to individually adjust the pressure spindle at full pressure in order to obtain a uniform finished product from bar rolling mills, for instance. As the screw itself can hardly be moved any more, owing to the great frictional losses involved at high pressures, the new device can be interposed between the pressure blocks and the screw.

By the interposition of this device it will then become possible to move a piston, at the expenditure of a minimum of force, to the extent of only a few fractions of a millimeter up or down, according to whether the roller pressure is to be increased or reduced, in order to attain uniform thickness of the product on both sides. Simultaneously, the roller pressure can be measured by using the highly elastic material for indicating the pressure during the deformation of the rubber or while it is discharged through an opening or nozzle. Finally, the height after adjustment may be measured directly by the motion of the piston.

The devices according to the invention are not only of very simple type but have very small dimensions also, so that they require little space and can be readily arranged anywhere. Nevertheless, they can be used for high and highest pressures, and a piston having a diameter of approximately 100 millimeters is capable, for example, of producing and measuring roller pressures up to 300 tons.

Several constructions of devices for carrying out the invention are diagrammatically illustrated in the accompanying drawings wherein, Figure 1 is a section through one form of the device in which the highly elastic medium in the intake pressure chamber is provided with extrusion means;

Figure 2 is a section through a somewhat modified form of the apparatus wherein the extrusion means includes a nozzle;

Figure 3 is a section through another modification of the invention in which the extruding means for the elastic medium comprises a specially formed nozzle;

Figure 4 is a section through a part of a modified form of the device, wherein the removable plug of highly elastic material is disposed between two nozzles;

Figure 5 is a section through a thin metal test apparatus embodying the invention;

Figure 6 is a section through a modified form of the apparatus shown in Figure 5;

Figure 7 is an enlarged cross-sectional detail of a further modification wherein certain of the operating parts are enclosed in a pressure chamber;

Figure 8 is a plan of a device utilizing the invention as a pressure chamber;

Figure 9 is a section through line IX—IX of Figure 8;

Figure 10 is a section through line X—X of Figure 8;

Figure 11 is a modification of the test device wherein are provided several chambers for taking up the elastic medium of which a part serves only for taking up the pressure;

Figure 12 is a section of the same.

In Fig. 1 the device comprises two pressure jaws 1, 2 or a basic body 1 and a pressure member 2 enclosing the pressure chamber filled with highly elastic material 3, preferably rubber, both jaws 1, 2 being adapted to be moved towards one another by the bolts 4. If an opening is provided as at 5, the elastic material 3 enclosed in the pressure space will be pressed out through this opening 5 when pressure P is exerted on the plate 2 in the direction of the arrow. The bulge 6 of the material 3 produced thereby may amount to a few millimeters only and can act on a movable member 7 or a test indicator of a dial indicator 8 or similar precision instrument which measures and indicates the force P according to the size of the bulge 6.

To avoid vacuums in the pressure chamber and to be able to measure static pressure, the elastic material 3 enclosed in the pressure chamber may be exposed to a certain preparatory pressure by employing, for instance, a set screw 9 which acts on the elastic material 3 and by the adjustment of which the desired preparatory pressure of the elastic material 3 may be attained and, simultaneously, regulated as required. In this way the inertia of the elastic material may be influenced also if necessary.

When the pressure P ceases, the elastic material 3 will resume substantially its original form while the bulge 6 disappears. Although this requires a certain time, as rubber has a peculiar inertia of its own, the high grade kinds of rubber of our time are nevertheless of such a quality that most deformation will disappear after a short time and the rubber will reassume its original form. If, after prolonged use, the rubber should display fatigue phenomena, the mass of rubber disposed in the pressure chamber can simply and easily be replaced by a mass of new rubber. The inertia of the rubber when returning to its original form can be eliminated also by pressing back the bulge 6 of the elastic material 3 by a force acting in the opposite direction. For this purpose, a pressure button 10 or the like may be provided for instance at the clock to move the member 7 against the bulge 6 and repress it, or any other suitable means may be employed. In view of the great stresses to which the testing device is subjected, the inertia of the rubber when reassuming its original form does not amount to much, as the bulge 6 when the pressure increases, i. e. is renewed again, will adjust itself properly, no matter whether the testing device has come completely to zero position or not.

Fig. 2 shows a slightly modified device, in which the elastic material 3 enclosed in the pressure chamber is pressed out through a nozzle 12 instead of through a round opening as in Fig. 1, into which the material 3 is pressed by the force P. Further differences are that the material in Fig. 2 is pressed out laterally instead on top and that a holding pipe 13 is provided for the indicator 8.

In the construction according to Fig. 3 the portion of the elastic material that is to be pressed out is formed by a special plug 14 which in response to the force P is pressed partly into the opening or nozzle 12. This arrangement affords the advantage that only the plug 14 instead of the entire rubber need be exchanged and replaced if necessary while the material 3 enclosed in the pressure chamber can be retained and is no longer caused to form the bulges 6 for measuring purposes. The holder 13 is extended up to the pressure chamber and receives the plug 14 and the nozzle 12. The material 3 and the plug 14 may consist of the same or different elastic substances.

Fig. 4 shows a similar construction to Fig. 3 with the difference, however, that two nozzles 12, 12¹ are arranged in series to distribute the pressure over both nozzle openings. The highly elastic material 3 enclosed in the pressure chamber acts on the nozzle 12¹ and the highly elastic plug 14 on the nozzle 12. This arrangement is advisable particularly in case of high pressures to limit pressing out in the various nozzles and to distribute pressure over two pressure chambers.

If required, several pressure stages, i. e., several nozzles and pressure chambers, may be employed, the pre-arranged pressure chambers taking up a portion of the force or motion to be measured and acting like buffers, while only a slight portion of the force or motion acts on the indicator 8.

Such buffers, receiving the main pressure, may be arranged at will in order to cause only a fraction of the pressure or force to act on the dial indicator.

Fig. 5 shows the device in connection with a sheet metal testing apparatus, the upper portion 15 of the dynamometer being displaceably arranged in the lower portion 16 and forming the die for the sheet testing apparatus while 17 indicates the blank holder and 18 the slide or punch acting under pressure on the sheet metal 19. In the divided pressure chamber formed by the two jaws 15, 16 of the force tester guided on the bolts 20 the elastic material 21, which in this case has annular shape, is provided and, by the action of the force P, pressed out again at 6 through an opening 5, nozzle or the like in order to indicate the force at the indicator 8 by the size of the bulge.

The sheet metal testing apparatus employed may be used in the known manner for bulging, drawing or otherwise testing the sheet metal, and the force tester described may be connected with stamping or other sheet metal working apparatus. The dynamometer may be employed further together with apparatus for testing and working other substances, such as fabrics, paper or the like.

Fig. 6 shows a similar construction as Fig. 5, though a special die 22 is used for the testing apparatus 17, 18, 22, and, as in Figs. 3 and 4, a special exchangeable plug 23 of highly elastic material is inserted which in response to the force P is pressed partly into a nozzle 12 inserted in the holder 13. As in Fig. 4, two or more nozzles may be inserted to form several pressure stages and chambers.

In the constructions described the bulge 6 acts directly on the dial indicator 8 or the like, but it is also possible to interpose between them a rigid, elastic or movable intermediate member which may further be utilized to transmit only a portion of the force or motion to the dial indicator and, instead of bulges 6, to measure other changes in the form of the elastic material due to the force or motion applied.

Such a construction is shown, for instance, in Fig. 7. 24, 25 are the two plates of the pressure chamber receiving the highly elastic material 26 which fills the chamber wholly or partly. In a holding tube 27 a punch 28 or the like is displaceable under pressure and pressed against or into the elastic material 26. In the construction shown this pressure is exerted by a spring 29 acting on the flange 30 of the punch 28 and supported relative to a nut 31 screwed into the holding tube 27 and adapted to adjust the tension of the spring 29 and thus the pressure acting on the punch 28. To facilitate the adjustment of the pressure the holding tube 27 may be provided outside at 31' with a scale and the nut 31 with a pointer or a cap nut 32 functioning as pointer. 8 is the dial indicator or the like which hugs the punch 28 or its flange 30 with its adjusting member 7.

The punch 28 is pressed by the action of the spring 29 into the highly elastic material 26, as indicated by dots, which elastic material changes its form under the influence of the force P and thus presses the punch 28 towards the outside against the action of the spring 29, the extent of the punch motion being indicated by the indicator 8 or the like.

At the point where the punch 28 enters the pressure space, the latter may be provided with corresponding bulges 33, 34 so as to render the changes in form of the rubber or the like more effective relative to the punch 28, or an elastic exchangeable member may be inserted at this point.

Instead of the punch 28 another rigid or elastic body may be introduced from without into the pressure chamber and pressed more or less out of it when the pressure P increases.

Figs. 8 to 10 show the invention applied to a roller pressure tester in connection with a roller adjusting device. Fig. 8 is a top view of the device; Fig. 9, a section on the line IX—IX, of Fig. 8; and Fig. 10, a section on the line X—X, of Fig. 8.

As in the constructions described already, the device consists of a basic body 35 and a pressure plate 36, which form the pressure chamber for the reception of the highly elastic material. The pressure chamber comprises two rectangularly crossed channels 37, 38, Fig. 8, which are formed by corresponding recesses or bores in the bottom of the hollow body 35 open on top and which serve for the reception of the soft rubber plugs 39, 40, Fig. 9. The bottom of the hollow body 35 is provided with a cross slot 41, 42 in which the soft rubber mass 43 is embedded which may be integral with, or separate from, the rubber plugs 39, 40, and the soft rubber mass is covered by a soft rubber plate 44 and a hard rubber plate 45 carrying the pressure plate 36. If desired the plates 44 and 45 may be dispensed with. The pressure plate 36 is limited in its stroke by the sleeve 46 and provided with a threaded opening 47 for the insertion of a pin for the roller adjustment. 48 is a removable stopper for inserting the rubber plug 40 in the channel 38, the other plug 39 being inserted through an angularly arranged opening in the basic body 35, which serves also for receiving the attachment 49 for the piston 50.

The piston 50 acting on the end of the rubber plug 39 is actuated by a spindle 51 and the hand wheel 52. The spindle 51 is connected by a sleeve 53 with a threaded bushing 54 which can be screwed to the attachment 49. By turning the spindle 51 by means of the wheel 52 the bushing 54 will be screwed to the attachment 49 and thus the piston 50 pressed against the end of the plug 39. A pointer 55 secured to the body 36 and adapted to cooperate with scale divisions on the bushing 54 indicates the degree of displacement and compression of the plug 39, the compression of which is transmitted to the rubber mass 40, 43, 44 whereby the pressure plate will be raised wholly or partly and the roller or other machine part adjusted accordingly. The motion of the pressure plate 36 can be transmitted to the machine part to be adjusted directly or by means of intermediate members. In this way pressures up to several hundred tons may be exerted at a minimum of adjusting motion.

The adjustment of the pressure plate 36 or the roller or other machine part regulated thereby may be indicated likewise by a special device. In the construction shown in the drawings, the pressure plate 36 is for this purpose connected to a lever or other similar suitable member 56 which passes through an opening 57 in the body 35 with ample play. The outer end of the member 56 is formed with an extension 58 for rigid connection, as at 59, with the solid portion of a dial indicator 60. The lever 61 operates the dial indicator so that the movement of the pressure plate 36 causes a corresponding movement of the dial indicator 60.

Furthermore, the device is provided with a second dial indicator 62 for measuring the pressure exerted on the elastic material. For this purpose the basic body 35 has at 63 a bore, nozzle or the like through which a part of the rubber plate 44 is pressed out to form a bulge, Fig. 10, which in turn acts on the piston 64 which compresses the highly elastic material 66 arranged between it and the firm support 65 which is inserted in the body 35 from below, secured in any suitable manner and may be adjustable. A portion of the rubber mass 66 is pressed out through the opening 67 of a tube 68 to form a bulge which acts on an adjusting member, not shown, in the member 69, the adjusting member releasing the adjustment in the indicator 62. If desired the bulge pressed out through the opening 63 may be used also for indicating in the indicator 62, but the former arrangement affords the advantage that the indicating or measuring bulge pressed out through the opening 67, and with it the rubber mass 66, is subjected only to a fraction of the power applied at the hand wheel 52.

Figures 11 and 12 illustrate another construction of pressure or movement indicating apparatus. A base 70 has formed in it three chambers 71, 71, 71, which are arranged at the corners of an equilateral triangle. A fourth chamber 74 is situated relatively to the other three in the manner shown in the drawings. A pressure plate 75 is provided on its under side with four pistons 72, 72, 72, and 73 which fit in the chambers 71 and the chamber 74, respectively. Each chamber is provided with a rubber plug; the chambers 71, however, function solely as pressure chambers, while the chamber 74 is provided with an opening through which the rubber is extruded and actuates the indicator 77 through the transmission mechanism 76.

In all constructions described the rubber bulge to be pressed out may be replaced, as stated in connection with Fig. 7, by an adjusting member introduced from without into the elastic material and acting on the dial indicator or the like.

The openings and nozzles through which pressing out takes place may have any desired form and may be shaped like a circle, square, slot and the like. Furthermore, the nozzles may be exchangeable and inserted in various sizes to adapt them to the various pressure conditions and increase sensibility. They may also be adjustable and displaceable—towards the pressure chamber, for instance—in order to return the elastic material to its initial or zero position against its natural inertia when the pressure has been read and the dynamometer relieved.

To facilitate the elastic flow of the elastic material enclosed in the pressure chamber and to prevent adhesion to the walls of the chamber, the material or the walls may be covered with graphite, talc or other means facilitating smooth gliding.

Force testers according to the invention may be made for any desired pressures in comparatively small sizes and used in connection with measuring devices, such as micrometers, and the like.

I claim:—

1. An apparatus for transforming operative motions consisting of a hollow container, a highly elastic, non-fluid and non-plastic mass therein, a plunger for exerting pressure on said elastic mass whereby the latter is deformed, said plunger comprising a threaded spindle, means for turning the said spindle, a threaded nut in operative connection with said threaded spindle, means for transmitting the axial force from said threaded spindle to said plunger, said transmitting means admitting a turning movement of the spindle relative to the plunger, and mechanical transmission means situated outside said container and operated by the deformation of the elastic mass produced by the said plunger.

2. An apparatus for measuring and indicating forces, pressure and movements, comprising a container, a highly elastic non-fluid and non-plastic mass enclosed therein, said container being provided with an opening, means extending into said container for exerting pressure on said mass, and mechanical transmission means situated outside said container and operated by the extrusion of the mass through said opening.

3. An apparatus for measuring and indicating forces, pressures and movements, comprising a rigid container, a highly elastic non-fluid and non-plastic mass enclosed in said container, said container being provided with an opening, means extending into said container for exerting pressure on said mass, mechanical transmission means situated outside said container and operated by the extrusion of the mass through said opening, and an indicating mechanism operated by said transmission means and showing the changes in the amount of said extrusion.

4. An apparatus for measuring and indicating forces, pressures and movements, comprising a container, a highly elastic, non-fluid and non-plastic mass enclosed therein, said container being provided with an opening, a mouthpiece in said opening, means extending into said container for exerting pressure on said mass, and mechanical transmission means, situated outside said container and operated by the extrusion of the mass through said mouthpiece of the opening.

5. An apparatus for transforming operative motions, for example for adjusting machine parts under heavy load, consisting of a hollow rigid container, a highly elastic, non-fluid and non-plastic mass, such as rubber, enclosed in said container and occupying practically the entire hollow of said container, a plunger for exerting pressure on said elastic mass, mechanical transmission means situated outside said container and operated by the deformation of the elastic mass obtained by the said pressure means, said container having a threaded bore formed therein and a screw within said threaded bore, for adjusting the rest position of said mechanical transmission means.

6. An apparatus for measuring and indicating forces, pressures and movements, comprising a rigid container, a highly elastic mass enclosed within said container, such as rubber, said container being provided with an opening, means for exerting pressure on said mass, a pressure screw in addition to the main pressure producing means for subjecting the pressure medium to an initial preparatory pressure which can be regulated, mechanical transmission means situated outside said container and operated by the extrusion of the mass through said opening, an indicating mechanism operated by said transmission means and showing the changes in the amount of said extrusion.

7. An apparatus for measuring and indicating forces, pressures and movements, comprising a rigid container, a highly elastic mass, such as rubber, enclosed within said container, said container being provided with an opening, means for exerting pressure on said mass, mechanical transmission means situated outside said container and operated by the extrusion of the mass through said opening, an indicating mechanism operated by said transmission means and showing the changes in the amount of said extrusion, and an external mechanical means adapted to return the elastic mass to zero position after said mass has undergone changes in form.

8. An apparatus for producing large forces and pressures, comprising a container, a highly elastic, non-fluid and non-plastic mass enclosed therein extending into contact with said elastic mass, means for exerting pressure thereon, and mechanical transmission means situated outside said container and operated by the deformation of the elastic mass obtained by the said pressure means, said mechanical transmission means acting on a machine part for the purpose of adjusting the same.

9. An apparatus for measuring and indicating forces, pressures and movements, comprising a plurality of containers, highly elastic non-fluid and non-plastic masses enclosed within said containers, means for exerting pressure upon said masses, one of said containers at least being provided with an opening, mechanical transmission means situated outside said containers and operated by the extrusion of the mass through said opening produced by said pressure-exerting means, and the remainder of said containers acting as pressure chambers only to take the greater part of the main pressure.

10. An apparatus for measuring and indicating forces, pressures and movements, comprising a rigid container, a highly elastic mass, such as rubber enclosed within said container, said container having an opening in the wall thereof, means for exerting pressure on said mass, mechanical transmission means situated outside said container and operated by the extrusion of the mass through said opening, such transmission means consisting of a touching pin, resting on the elastic mass, an indicating mechanism operated by said touching pin and showing the changes in the amount of said extrusion.

11. An apparatus for measuring and indicating forces, pressures and movements, comprising a rigid container, a highly elastic mass, such as rubber, enclosed within said container, said container having an opening in the wall thereof, means for exerting pressure on said mass, mechanical transmission means situated outside said container and operated by the free surface of the mass through said opening, a touching pin included in said transmission means and resting on the elastic mass, an indicating mechanism operated by said touching pin and showing the changes in the amount of the extrusion of the elastic mass, an abutment projecting laterally from said touching pin, and resilient means acting against the said abutment to press the pin against the elastic mass.

12. An apparatus for measuring and indicating forces, pressures and movements, comprising a rigid container, a highly elastic mass such as rubber, enclosed therein, said container having an opening in the wall thereof, means for exerting pressure on said mass, mechanical transmission means situated outside said container and operated by the extrusion of the mass through said opening, a touching pin included in said transmission means and resting on the elastic mass, an indicating mechanism operated by said transmission means showing the changes in the amount of the extrusion of the elastic mass, an abutment projecting laterally from said touching pin, and resilient means acting against the said abutment to press the pin against the elastic mass, the tension of said resilient means being such that the major part of the pressing force is balanced by the reaction force exerted by the extruding mass.

13. An apparatus for measuring and indicating forces, pressures and movements, comprising a container, a highly elastic non-fluid and non-plastic mass, such as rubber, enclosed within said container, said container having an opening in the wall thereof, means extending into said container for exerting pressure on said mass, stop means for limiting the resulting deformation, and mechanical transmission means situated outside said container and operated by the free surface of the mass through said opening.

ABRAHAM MARTINIUS ERICHSEN.